United States Patent [19]

Lebrun et al.

[11] Patent Number: 5,083,607
[45] Date of Patent: Jan. 28, 1992

[54] DEVICES FOR PRODUCING COLD AND/OR HEAT BY SOLID-GAS REACTION MANAGED BY GRAVITATIONAL HEAT PIPES

[75] Inventors: Michel Lebrun, Perpignan; Sylvain Mauran, Espira de P'Agly; Bernard Spinner, Elne, all of France

[73] Assignee: Societe Nationale Elf Aquitaine, Courbevoie, France

[21] Appl. No.: 600,833

[22] Filed: Oct. 22, 1990

[30] Foreign Application Priority Data

Oct. 24, 1989 [FR] France .................................. 8913913

[51] Int. Cl.⁵ ............................................. F25B 17/08
[52] U.S. Cl. .................................. 165/104.12; 62/478; 62/480
[58] Field of Search ...................... 165/104.12; 62/480, 62/478

[56] References Cited

U.S. PATENT DOCUMENTS 4,161,211 7/1979 Duffy et al. .................... 165/104.12
4,413,670 11/1983 Ritter .............................. 165/104.12

Primary Examiner—Albert W. Davis, Jr.
Attorney, Agent, or Firm—Oblon, Spivak, McClelland, Maier & Neustadt

[57] ABSTRACT

Device for producing cold and/or heat by solid-gas reaction, intended to be used, for example, for air conditioning, including reactor chambers, each chamber being intended to contain a reagent formed from a mixture of a salt and an expanded product which is a good thermal conductor, the reagent being able to react through absorption with a gas according to an exothermic reaction, the device including moreover, a passage for a fluid to be cooled and a passage for a fluid to be heated. According to the invention, the device includes reactor chambers connected together pairwise, the transfer of heat between the reactor chambers and with the fluid being afforded by heat pipes of the gravitational type.

7 Claims, 5 Drawing Sheets

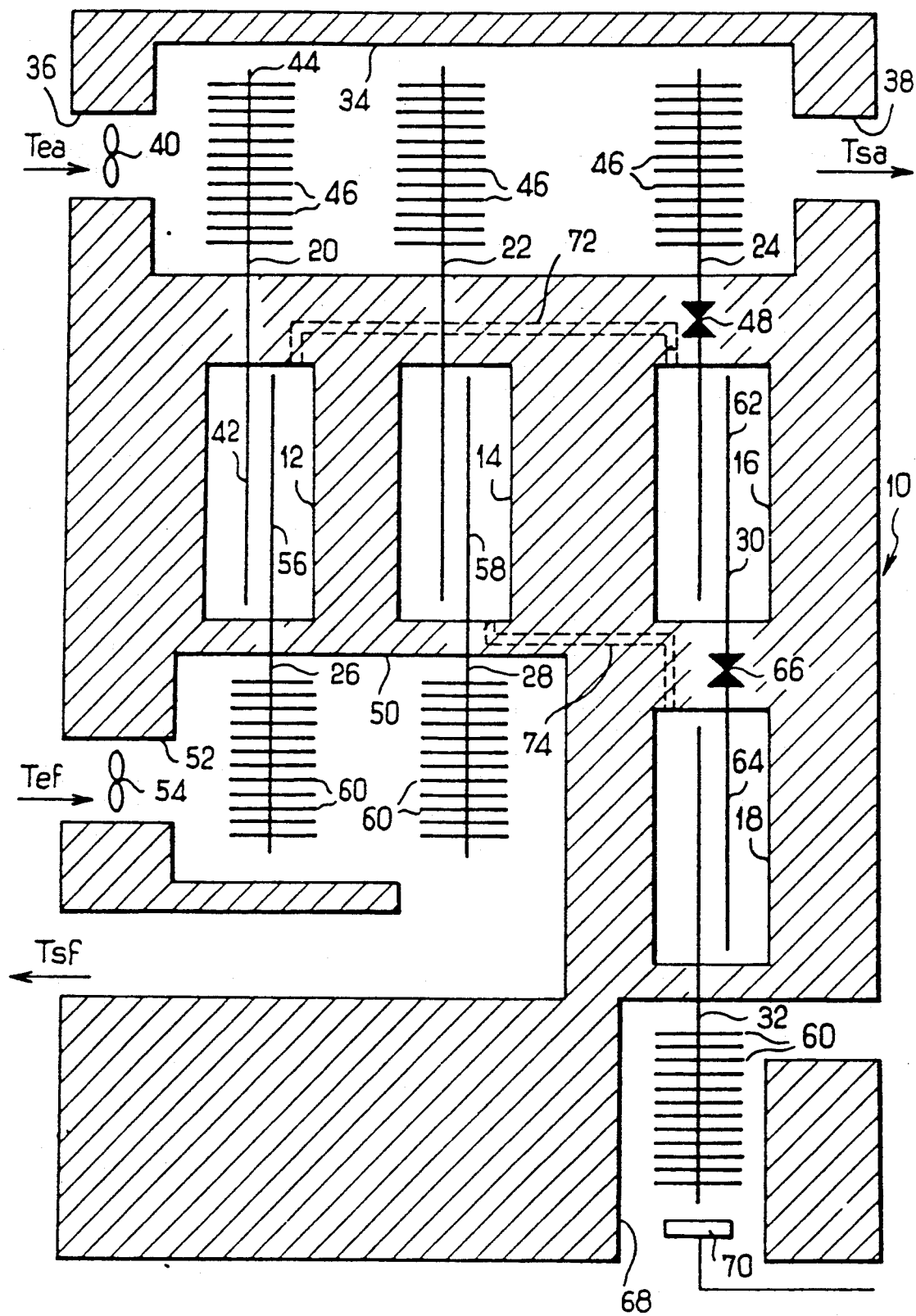
FIG_1

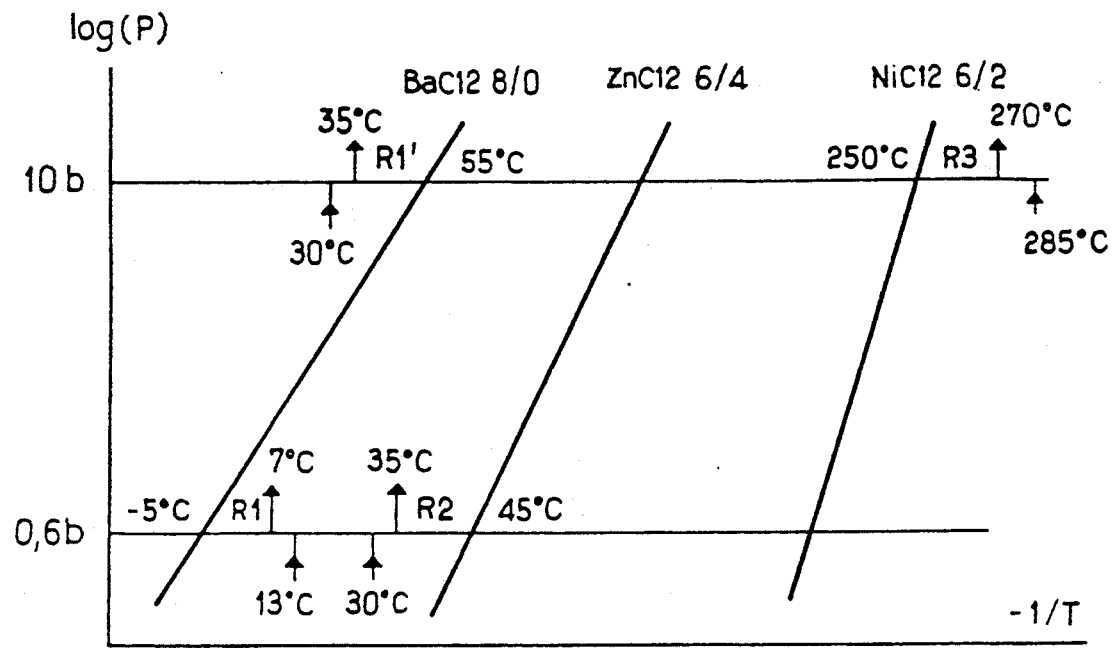
FIG_2
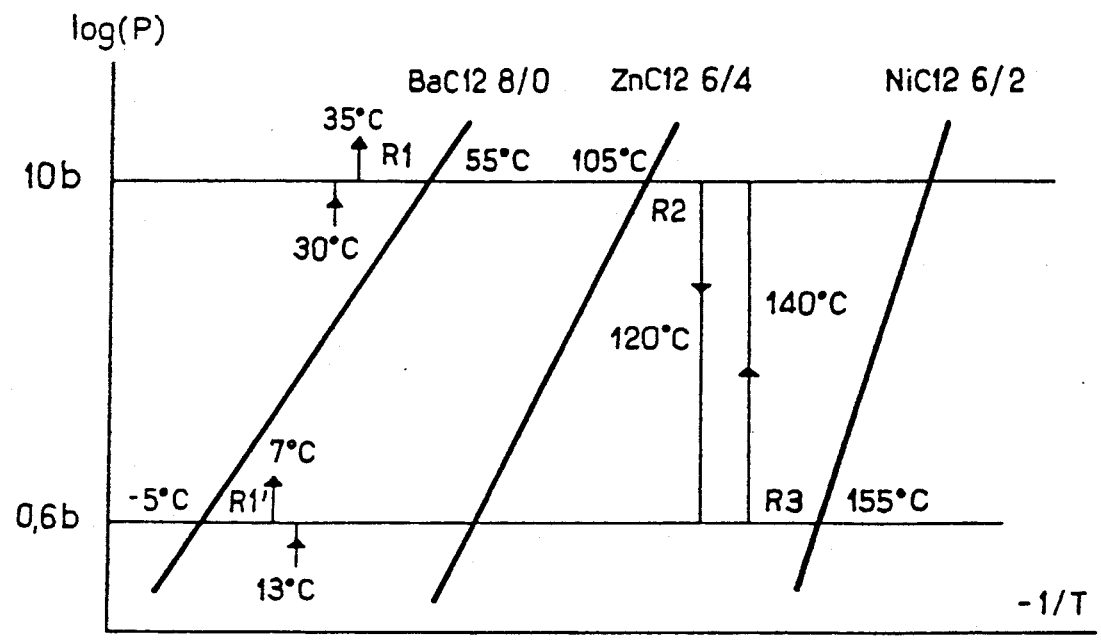
FIG_3

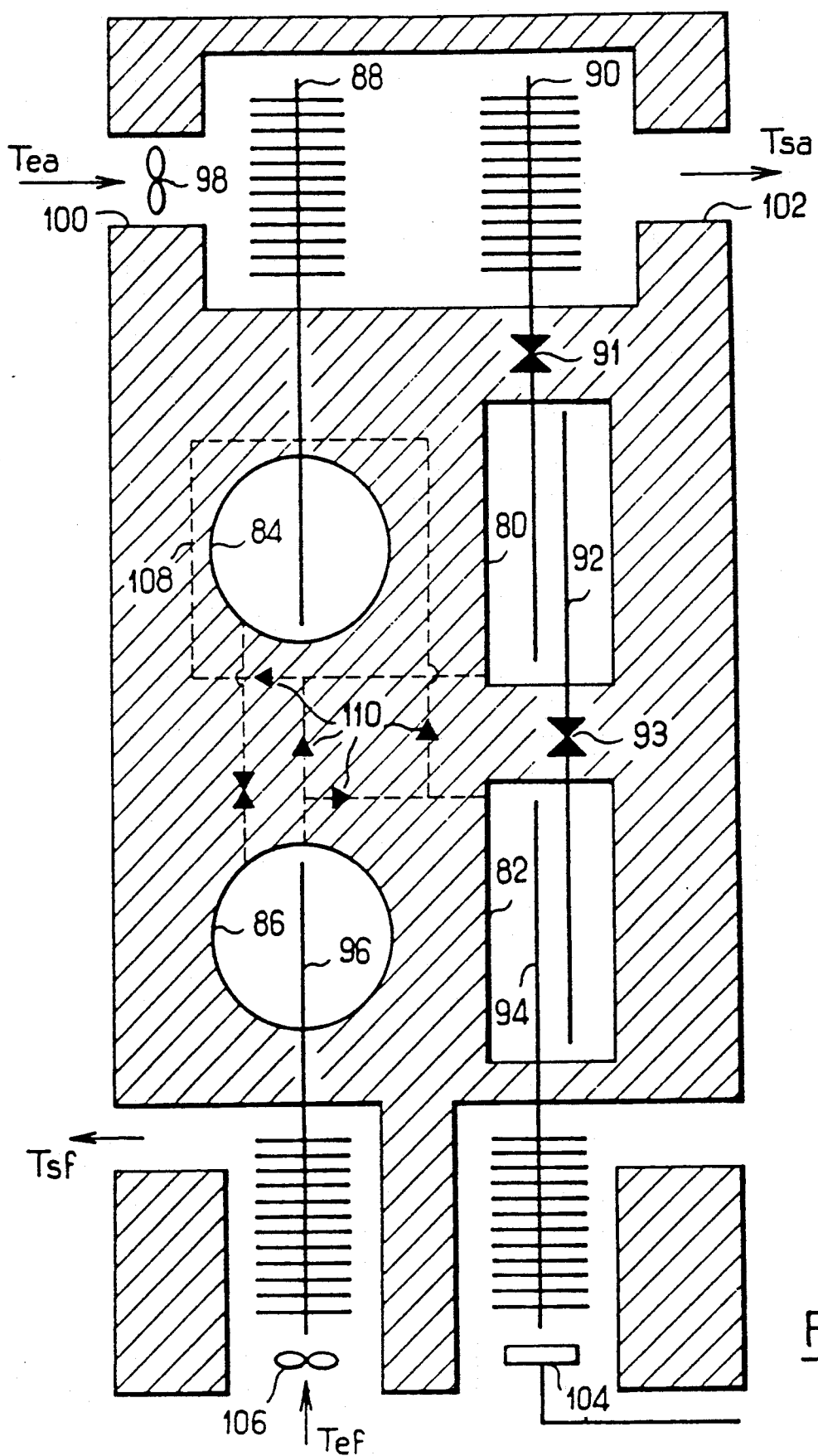
FIG_4

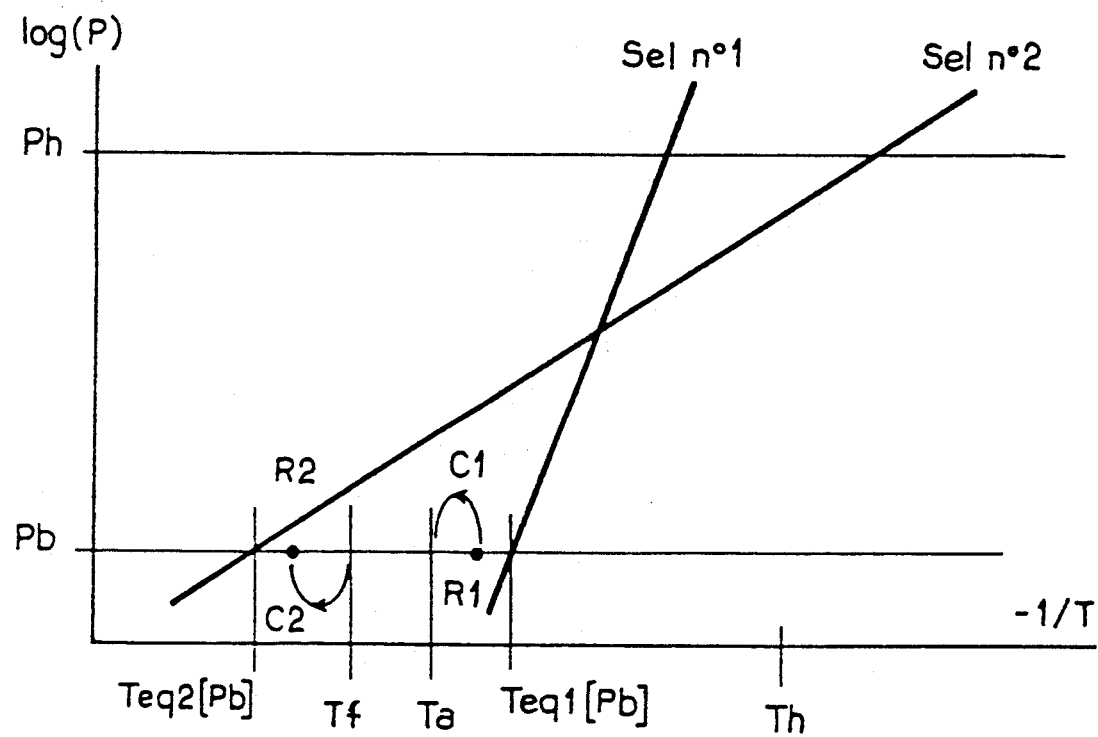
FIG_6

DEVICES FOR PRODUCING COLD AND/OR HEAT BY SOLID-GAS REACTION MANAGED BY GRAVITATIONAL HEAT PIPES

BACKGROUND OF THE INVENTION

1. Field of the Invention

The present invention relates to a device for producing cold and/or heat by solid/gas reaction and, more particularly, relates to an air conditioning unit with heat pumps.

2. Discussion of the Background

The device addressed by the invention is based on the use of the so-called "thermochemical pump" system, whose main characteristics are the following:

- thermal energy is used for the operation of the system itself; electrical energy is used, if at all, only for the circulation of the heat-transfer fluids, or through its Joule effect; and
- a reversible reaction between a solid and a gas of the type:

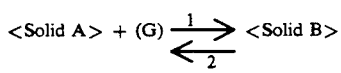

is used as "chemical engine".

The reaction is exothermic in direction 1, which means that in this direction it produces heat, and endothermic in direction 2, that is to say that in this direction it produces cold.

Such a system enables the storage of energy in chemical form and offers various areas of application.

Moreover, such a system enables the production, from a heat source at the temperature Ts, of heat at the temperature Tu such that:

$$Tu < Ts$$

In this case, the system is referred to as "chemical heat pump".

Likewise, such a system enables the production, from a heat source at the temperature T's, of heat at the temperature T'u such that:

$$T'u > T's$$

In this case, the system is referred to as "chemical heat transformer".

By virtue of this system it is possible to produce cooling energy from a heat source and to simultaneously produce, from a heat source at the temperature T"s, heat at the temperature T"u (T"u < T"s) and cooling energy.

Depending on the case, the use of the heat or of the cold produced is simultaneous with the consumption of energy at high temperature (Ts, T's, T"s) or, differing in time (storage effect).

A device for continuous production of cold and/or heat which comprises two reactors containing the same solid compound, a condenser and an evaporator is known from the French Patent Application No. 87 07210.

Despite its advantages, this device is of limited efficiency and requires a large number of components and operating devices.

SUMMARY OF THE INVENTION

Hence, the aim of the present invention is to provide a device for producing cold and/or heat, such as an air conditioning unit, which is of improved efficiency and which requires a minimum number of operating devices.

According to a first aspect, the invention addresses a device for producing cold and/or heat by a solid-gas reaction, comprising reactor chambers, each chamber being intended to contain a reagent formed from a mixture of a salt and an expanded product which is a good thermal conductor, the reagent being able to react through absorption with a gas according to an exothermic reaction, the device comprising moreover a passage for a fluid to be cooled and a passage for a fluid to be heated, characterized in that the device comprises reactor chambers linked together in pairs, the transfer of heat between the reactor chambers of the same pair and with the fluid being afforded by heat pipes of the gravitational type.

BRIEF DESCRIPTION OF THE DRAWINGS

The advantages, as well as the operation of the present invention will emerge more clearly upon reading the following description made in a non-limiting way while referring to the attached drawings in which:

FIG. 1 is a schematic cross-sectional view of an air conditioning unit with heat pumps according to the invention; and FIGS. 2 and 3 are Clapeyron diagrams representing two operating steps of the air conditioning unit of FIG. 1;

FIG. 4 is a schematic cross-sectional view of an air conditioning unit according to a second embodiment of the invention;

FIG. 6 is a Clapeyron diagram representing one operating step of the air conditioning unit of FIG. 5.

DESCRIPTION OF THE PREFERRED EMBODIMENT

Figure 5:
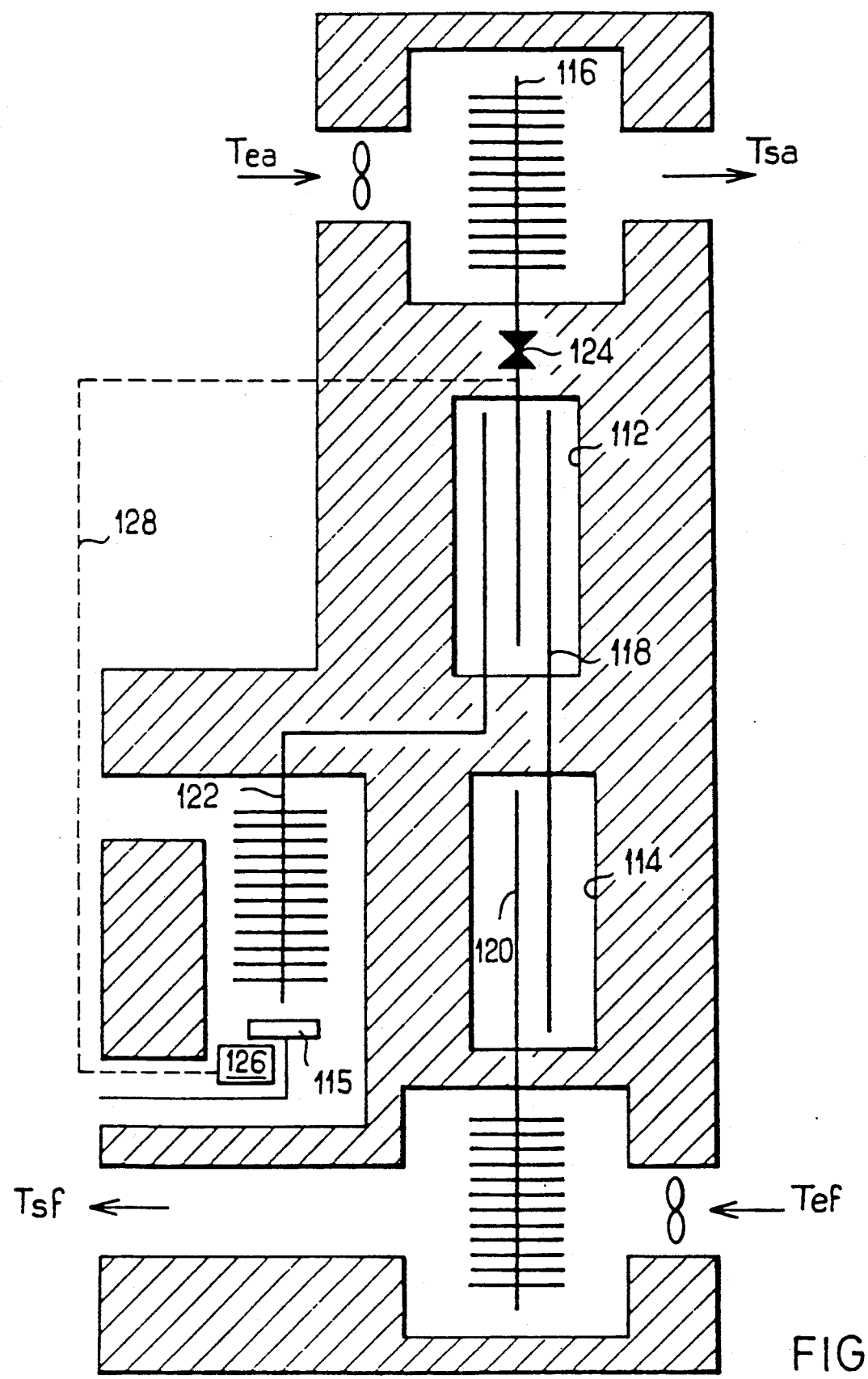
FIG. 5 is a schematic cross-sectional view of an air conditioning unit according to a third embodiment of the invention.

An air conditioning unit with heat pumps which, in the example illustrated, is intended to cool air circulating in a room from 13° to 7° C. is represented in FIG. 1. The air conditioning unit comprises a body 10 formed in a material having thermal insulation properties and in which four reactor chambers 12, 14, 16 and 18 are defined. Each reactor chamber is filled with a salt, as will be described in more detail hereinbelow.

So as to enable the passage of heat between the reactors 12, 14, 16 and 18 and the air, the air conditioning unit comprises heat-transfer devices which are so-called "gravitational" heat pipes. In a known manner a gravitational heat pipe comprises a tube the lower part of which contains a fluid which, placed in contact with a heat source, evaporates towards the upper part of the tube, which part is itself placed in contact with a colder temperature source, in such a way as to condense the vapor into liquid form in this upper part. This liquid returns to the lower part of the heat pipe under gravity. Such a heat pipe forms a continuous system but requires a temperature gradient in order to operate and, furthermore, uses the effect of gravity. Thus, such heat pipes are thermo diodes, operating only when the temperature of their lower part is greater than that of their upper part. The present air conditioning unit comprises seven gravitational heat pipes 20, 22, 24, 26, 28, 30 and 32 as will be described in more detail hereinafter.

A first air passage 34, comprising two reduced diameter sections 36 and 38, is formed in the upper part of the body 10 of the air conditioning unit. A ventilator 40, arranged in the section 36, is intended to circulate the ambient air in the passage 34 in the direction of the arrows. A first heat pipe 20 is mounted in the body 10 in a such a way that its lower part 42 projects into the reactor chamber 12. Its upper part 44 which is equipped with, for example, fins 46 facilitating the transfer of heat or, any type of air exchanger, projects into the air passage 34. Similarly, the heat pipes 22 and 24 are mounted between the reactor chambers 14 and 16 and the air passage 34. Each of these heat pipes 22 and 24 is equipped with fins 46, the heat pipe 24 comprising moreover a control valve 48 intended to control the passage of fluid in the heat pipe 24 and thus its startup.

A second air passage 50 is formed in the body 10 of the air conditioning unit and comprises a reduced diameter section 52 in which a ventilator 54, intended to circulate the air to be cooled in the passage 50 in the direction of the arrows, is mounted. The heat pipes 26 and 28 are mounted in the body 10 of the air conditioning unit in such a way that their upper parts 56, 58 project respectively into the reactor chambers 12 and 14. The lower part of each heat pipe 26 and 28 projects into the air passage 50 and comprises fins 60 so as to facilitate the transfer of heat between the heat pipes 26, 28 and the air to be cooled.

The chambers of reactors 16 and 18 are connected by the heat pipe 30, the upper part 62 of the latter projecting into the reactor chamber 16 and the lower part 64 being received in the reactor chamber 18. Just like the heat pipe 24, the heat pipe 30 is equipped with a control valve 66. This heat pipe 30, like the parts of the heat pipes 20, 22, 24 and 32 in contact with the reactive salt, is equipped with an exchanger suitable for the thermal transfers with the porous solid media.

The body 10 of the air conditioning unit is equipped with a third passage 68 in which a heat source, which in the example illustrated is a boiler burner 70, is mounted. The last heat pipe 32 is mounted with its upper part in the reactor chamber 18, its lower part, equipped with fins 60, being received in the passage 68 next to the burner 70. The reactor chambers 12 and 16 are in permanent communication by way of a passage 72. Similarly, the reactor chambers 14 and 18 communicate via a passage 74.

Each chamber of reactors 12 to 18 is filled with an associated reagent containing a salt and is chosen so as to ensure the specified function of the air conditioning unit. In the present example where the air conditioning unit is intended to cool an air circulation in a room from 13° to 7° C., the reactor chambers are filled as follows. In each case, the reagent is formed from a mixture of a pulverulent salt and an expanded product which is a good thermal conductor. Preferably, the expanded product is expanded graphite.

The reactor chambers 12 and 14 are filled with a reagent containing a salt such as $BaCl_2/NH_3$ which enables an absorption-desorption cycling. The reactor chamber 16 contains a salt such as $ZnCl_2/NH_3$ enabling absorbtion to be effected at a temperature level greater than or equal to 45° C. at the pressure imposed by the reactor 12 during desorption. The reactor chamber 18 is filled with a reagent containing a salt, for example $NiCl_2/NH_3$ which enables absorbtion to be effected at a higher temperature level, at least 30° C., than the temperature level required to effect the desorption from the reactor 16 at the pressure level imposed by the reactor 14 during absorption.

The heat pipes 20 to 32 likewise have special characteristics which are selected so as to ensure the operation of the air conditioning unit under given conditions. In the example illustrated the characteristics are the following. The heat pipes 20 and 22 are simple gravitational heat pipes having a minimum range of operation 20° to 60° C., the extreme constraints being, 20° C. the minimum temperature of the external air and, 60° C. the maximum temperature of the salt +5° C.

As already described, the heat pipe 24 is equipped with a valve 48, the operating range is from 20° to 160° C., the extreme constraints being, 20° C. the minimum temperature of the external air and, 160° C. the maximum temperature of the salt +5° C.

Similarly, the characteristics of the heat pipes 26 to 32 are as follows:

Heat pipes 26 and 28: Simple gravitational heat pipes
  Operating range: −10° C. to 35° C.
  Extreme constraints: −10° C. to 50° C.
    (−10° C.=Minimum temperature of the salt −5° C.)
    (+35° C.=Maximum temperature of the room)
    (+50° C.=Maximum temperature of the salt +5° C.)

Heat pipe 30: Gravitational heat pipe equipped with a valve 66
  Operating range: +40° C. to 285° C.
  Extreme constraints: +40° C. to 285° C.
    (+40° C.=Minimum temperature of the salt of the reactor 16 −5° C.)
    (285° C.=Maximum temperature of the salt of the reactor 18 +5° C.)

Heat pipe 32: Simple gravitational heat pipe
  Operating range: +100° C. to 285° C.
  Extreme constraints: +100° C. to 285° C.
    (+100° C.=Minimum temperature of the salt −5° C.)
    (+285° C.=Maximum temperature of the salt +5° C.)

The operation of the devices according to the invention is based on the reaction between a salt and a gas. Since a true chemical reaction is involved, the system is monovariant at equilibrium, that is to say there exist a one-to-one relationship between the temperature and the pressure of the form $\log P = a - B/T$, an expression in which P is the pressure, T the temperature in °K., and A and B are constants characteristic of the salt/gas pair used.

In the subsequent description, the operating phases will be represented in Clapeyron diagrams, such as indicated in FIGS. 2 and 3 and which comprise equilibrium lines for the salts used.

On starting up the air conditioning unit the input temperature of air from the room is 13° C., that of the external air is 30° C. and the temperature of the boiler is 285° C. The valve 48 is open and the valve 66 is closed.

The reactors are in the following initial states:
Reactor 12: start of desorption
  T=10° C. (distance to equilibrium 15° C.)
Reactor 16: start of absorption
  T=30° C. (distance to equilibrium 15° C.)
Reactor 14: start of absorption
  T=40° C. (distance to equilibrium 15° C.)

Reactor 18: start of desorption
T=265° C. (distance to equilibrium 15° C.)

Under these conditions, and knowing that the gravitational heat pipes do not operate unless the temperature of their lower part is greater than that of their upper part, only the heat pipes 22, 24, 26 and 32 are in operation.

The desorption occurring in reactor 12 maintains it at a temperature between −5° C. and 5° C. The production of cold is therefore ensured by way of the heat pipe 26.

The absorption occurring in the reactor 16 maintains it at a temperature between 35° C. and 45° C. The heat pipe 24 expels the heat from this reaction into the external air.

The absorption occurring in the reactor 14 maintains it at a temperature between 35° C. and 55° C. The heat pipe 22 expels the heat from this reaction into the external air.

The heat pipe 32 carries the calories from the boiler 70 to the reactor 18, maintaining it at a temperature between 250° C. and 285° C., which ensures the desorption reaction of the latter.

The opening of the valve 66, the closing of the valve 48 and the stoppage of the boiler enable the passage of the air conditioning unit to the subsequent step.

The boiler having stopped, the temperature of the latter drops to a level less than 100° C. The use of a third ventilator could be envizaged in order to ensure the rapidity of this temperature reduction. The heat pipe 32 is therefore no longer in an operating state, the temperature of its lower part being less than that of its upper part.

The valve 48 being closed, the heat pipe 24 cannot operate.

The reactor 18 being at a temperature greater than the reactor 16, the heat pipe 30 is operative, the valve 66 being open. The heat pipe 30 therefore ensures passage of the heat from the reactor 18 towards the reactor 16, causing the cooling of the reactor 18 and the heating of the reactor 16.

Cooling of the reactor 18 causes its passage from a desorption condition to an absorption condition. The reactor 18 is connected to the reactor 14 which is still under absorption conditions. The two reactors 14 and 18 are thus absorbing, which causes a pressure fall in both the reactors 14 and 18 through a deficit of the absorbed gas.

The reactor 14 will therefore soon be under desorption conditions and its temperature will therefore fall through the endothermic effect of this desorption. Starting from a temperature of around 35° C. to 40° C. (end of absorption) the temperature will pass through a level less than 30° C. The heat pipe 22 will then be inoperative. Reducing further, the temperature will pass to a level less than 13° C. and the heat pipe 28 will operate, thus ensuring the production of cold air.

The heating of the reactor 16 causes its passage from an absorption condition to a desorption condition. The reactor 16 is connected to the reactor 12 which is still under desorption conditions. The two reactors 12 and 16 are therefore desorbing, which causes an increase of pressure in both the reactors 12 and 16 through accumulation of the desorbed gas.

The reactor 12 will therefore soon be under absorption conditions. Its temperature will rise through the exothermic effect of this absorption. Starting from a temperature of around 0° C. to 5° C. (i.e. the end desorption) the temperature will pass to a level greater than 13° C. The heat pipe 26 will then be inoperative. Rising further, the temperature will pass above 30° C. and the heat pipe 20 will operate, ensuring the expulsion of the heat produced by the absorption in the reactor 12.

The air conditioning unit thus passes to the third step in which the heat pipes 20, 28 and 30 are in a working mode.

The absorption occurring in the reactor 12 maintains it at a temperature between 35° C. and 55° C. The heat pipe 20 expels the heat from this reaction into the external air.

The desorption occurring in the reactor 14 maintains it at a temperature between −5° C. and 5° C. The production of cold is therefore ensured by way of the heat pipe 28.

The operation of the heat pipe 30 enabling the passage of the heat from the reactor 18 towards the reactor 16, the desorption occurring in the reactor 16 and the absorption occurring in the reactor 18 combine to maintain the reactor 16 at a temperature between 105° C. and 140° C. and the reactor 18 at a temperature between 120° C. and 155° C. These conditions ensure the operation of the system.

At the end of this step the closing of the valve 66 and the opening of the valve 48, as well as the starting up of the boiler, enable the passage to the final step.

The valve 66 being closed, the heat pipe 30 is out of action and the heat can no longer pass from the reactor 18 to the reactor 16.

The reactor 16 being at a temperature greater than that of the external air, opening of the valve 48 enables the operation of the heat pipe 24, which therefore ensures cooling of the reactor 16.

Cooling of the reactor 16 causes its passage from a desorption condition to an absorption condition. The reactor 16 is connected to the reactor 12 which is still under absorption conditions and the two reactors are therefore both absorbing. This causes a pressure fall in both reactors 12 and 16 through deficit of the absorbed gas.

The reactor 12 will therefore soon be under desorption conditions and its temperature will fall through the endothermic effect of this desorption. Starting from a temperature of around 35° C. to 40° C. (i.e., end absorption) the temperature will pass to a level less than 30° C. The heat pipe 20 will then be inoperative. Reducing further, the temperature will pass to a level less than 13° C. and the heat pipe 26 will operate, thus ensuring the production of cold air.

The operation of the boiler 70 enables the heating of the lower part of the heat pipe 32 to a temperature level of 285° C. The reactor 18 being at a temperature of around 120° C. to 140° C. (i.e., end absorption), the heat pipe 32 is therefore in an operating state, which ensures the heating of the reactor 18.

The heating of the reactor 18 causes the passage from an absorption condition to a desorption condition. The reactor 18 being connected to the reactor 14 which is still under desorption conditions, the two reactors are therefore in a desorption condition. This causes a pressure increase in both reactors 14 and 18 through accumulation of the desorbed gas.

The reactor 14 will therefore soon be under absorption conditions in which its temperature will rise through the exothermic effect of this absorption. Starting from a temperature of around 0° C. to 5° C. (i.e., end desorption) the temperature will pass to a level greater than 13° C. and the heat pipe 28 will then be inoperative. Rising further, the temperature will pass above 30° C. and the heat pipe 22 will operate, ensuring the expulsion of the heat produced by the absorption in the reactor 14.

From this condition the operating cycle of the air conditioning unit can repeat from the first step.

The chain of the four phases which has just been described therefore enables the operation of the air conditioning unit in a continuous mode.

Hence, the present invention enables construction of an air conditioning unit with heat pumps, which comprises a very small number of operating devices. The latter are reduced to three, namely valves 48 and 66 and a start/stop control for the boiler 70.

A second embodiment of an air conditioning unit with heat pumps is represented in FIG. 4. This device differs from that described hereinbefore in that it comprises two reactor chambers 80, 82, a condenser 84 and an evaporator 86. The device moreover comprises five gravitational heat pipes 88, 90, 92, 94 and 96 which are analogous to those used in the air conditioning unit of FIG. 1. As for the other embodiment, the device of FIG. 4 comprises a ventilator 98 intended to circulate ambient air between the input 100 and the output 102 in the direction of the arrows, as well as a burner 104 and a second ventilator 106 intended to circulate the air to be cooled.

The heat pipes 90 and 92 are each equipped with a control valve 91 and 93 intended to control the passage of fluid into the heat pipe and hence, its starting up. The reactor chambers 80, 82, the condenser 84 and the evaporator 86 are connected together by a gas circuit 108—represented by dashed lines—which comprises four nonreturn valves 110. The reactor chamber 80 is filled with a reagent containing a salt enabling absorption to be effected at a temperature level greater than or equal to the temperature of the ambient air. The reactor chamber 82 is filled with a reagent containing a salt enabling absorption to be effected at a temperature level greater than that required to effect the desorption from the reactor 80.

The operation of the device is substantially analogous to that of the device of FIG. 1, the operating cycle being controlled by the starting up of the burner 104 and the selective opening of the valves 91 and 93. As for the device of FIG. 1, the use of the gravitational heat pipes 88, 90, 92, 94 and 96 enables construction of an air conditioning unit with heat pumps, which comprises a very small number of operating devices, three in this instance; the valves 91 and 93 and the start/stop control of the burner 104.

A third embodiment of an air conditioning unit with chemical heat pumps is represented in FIG. 5. This device comprises two reactor chambers 112 and 114 and is intended to produce simultaneously, but discontinuously, cold at the temperature $T_f$ and heat at the temperature Ta on using the heat from a burner 115. Continuous production can be provided by using two analogous devices operating in phase opposition. This device comprises four gravitational heat pipes 116, 118, 120 and 122, of which only the heat pipe 118 is equipped with a control valve 124.

The reactor chamber 112 is filled with a reagent containing a salt enabling absorption to be effected at a temperature level greater than or equal to the temperature Ta of the ambient air and at a pressure $P_b$, and desorption at a temperature level less than the temperature of the burner 115 and at a pressure $P_h$. The reactor chamber 114 contains a reagent containing a salt enabling absorption to be effected at a temperature level greater than that required to effect the desorption from the reactor 112 at the pressure $P_h$, and desorption at a temperature less than $T_f$ and at the pressure $P_b$. As represented in FIG. 6, the salts having these described characteristics have equilibrium lines which cross over in the interval in question.

As for the previous devices the use of gravitational heat pipes enables construction of an air conditioning unit having a very small number of operating devices.

In the three embodiments of the invention described hereinbefore, the control of the functioning gravitational heat pipes has been described as being effected by control valves. However, the operation of a gravitational heat pipe can be controlled without mechanical control by using the properties of an inert gas, such as neon, which, when introduced into a heat pipe prevents the operation thereof. Thus, it suffices to provide a reservoir of inert gas which contains a material able to absorb or desorb the gas as a function of the temperature of the material. Such a material may be, for example, a zeolite.

By way of example, this type of control system is represented in FIG. 5, but it may be adapted to the devices of FIGS. 1 and 4. A reservoir 126 is arranged next to the burner 115 and connected to the heat pipe 116 by a passage 128. At ambient temperature the material in the reservoir 126 absorbs the inert gas and enables the heat pipe to operate. When the heat pipe 115 is started up, the temperature of the material rises and the inert gas is desorbed and passes into the interior of the heat pipe 116. The pressure of the gas prevents the operation of the heat pipe, thus stopping the transfer of heat. Thus, the start/stop control of the burner alone controls the operation of the air conditioning unit.

As far as the devices of FIGS. 1 and 4 are concerned, the two control valves 48 and 66, and 91 and 93, can likewise be replaced by an inert gas system. The heat pipes 24 and 90 are controlled from the burner as was the case for the device of FIG. 5. As far as the heat pipes 30 and 92 are concerned, they are controlled by a reservoir of inert gas which contains an electrical resistor which is fed during the stoppage phase of the burner. The operation of the heat pipes 30 and 92 is thus prevented during stoppage of the burner. With such a system the number of control devices is further reduced.

The use of heat pipes enables a reduction in the irreversibilities of the heat transfers due to the usual narrowings which are required for the operation of conventional exchanges.

Moreover, with the air conditioning unit according to the present invention, the modulation of the production of cold may be carried out at low cost through the use of two valves for regulating the flow of gas, respectively situated in each of the passages 72 and 74 for the device of FIG. 1 or, at the evaporator input and at the condenser output for the device in FIG. 4.

In the case where the device is intended to afford the air conditioning of a vehicle with an internal combustion engine, the boiler may advantageously be replaced by a system for reclamation of heat from the exhaust gases.

The gravitational heat pipes may be replaced by any other heat pipe able to act as a thermal diode.

We claim:

1. Device for producing cold and/or heat by solid-gas reaction, which comprises:
   a body having a plurality of reactor chambers, each of said chambers containing a reagent formed from a mixture of a salt and an expanded product which is a thermal conductor, wherein the reagent reacts through absorption with a gas according to an exothermic reaction,
   first passage means for a fluid to be cooled and for a fluid to be heated,
   second and third passage means for linking together, respectively, a first pair and a second pair of said plurality of reactor chambers;
   a plurality of heat pipes for transferring heat to the reactor chambers from one of an external source and a sink, a pair of said heat pipes being positioned within one of said plurality of reactor chambers; and
   control valves for separately controlling said pair of said heat pipes which are positioned within one of said plurality of reactor chambers.

2. Device according to claim 1, wherein said plurality of chambers comprise four reactor chambers connected together pairwise, the transfer of heat between each reactor chamber and external source occuring by one of said gravitational heat pipes.

3. Device according to claim 1, wherein said plurality of heat chambers comprise two reactor chambers, and which comprises a condenser and an evaporator for the gas, the transfer of heat between the reactor chambers and between the reactor chambers, the condenser, the evaporator and external sources occurring by said gravitational heat pipes.

4. Device according to claim 3, wherein said heat pipes comprise five gravitational heat pipes of which only two comprise an associated control valve.

5. Device according to claim 1, wherein said plurality of chambers comprise two reactor chambers, and the transfer of heat between the reactor chambers and between the reactor chambers and external sources occurring by said gravitational heat pipes.

6. Device according to one of claims 2 to 5 which comprises means for rendering an associated gravitational heat pipe inoperative, which includes a reservoir for absorbing or desorbing an inert gas as a function of the temperature of the reservoir, and means for connecting the reservoir to the gravitational heat pipe.

7. A device for producing cold and/or heat by solid-gas reaction, which comprises:
   a body having a plurality of reactor chambers, each of said chambers containing a reagent formed from a mixture of a salt and an expanded product which is a thermal conductor, wherein the reagent reacts through absorption with a gas according to an exothermic reaction;
   passage means for a fluid to be cooled and for a fluid to be heated which communicates a first pair and a second pair of said reactor chambers together, respectively;
   a plurality of heat pipes for transferring heat to the reactor chambers from one of an external source and a sink wherein the transfer of heat between each reactor chamber and an external source occurs by one of said gravitational heat pipes and wherein said heat pipes comprise seven gravitational heat pipes of which only two comprise an associated control valve for controlling operation of the device.

* * * * *